(12) United States Patent
Maruyama

(10) Patent No.: US 6,249,651 B1
(45) Date of Patent: Jun. 19, 2001

(54) CAMERA FOR ELECTRONIC PHOTOGRAPHING AND PHOTOGRAPHING USING FILMS

(75) Inventor: Atsushi Maruyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/310,644

(22) Filed: May 12, 1999

(30) Foreign Application Priority Data

May 14, 1998 (JP) .................................................. 10-131959

(51) Int. Cl.[7] .............................. G03B 7/26; G03B 13/02
(52) U.S. Cl. ........................ 396/303; 396/301; 396/374; 348/64
(58) Field of Search ..................................... 396/301, 302, 396/303, 374, 429, 287; 348/64, 333.01, 333.02, 333.03, 333.04

(56) References Cited

U.S. PATENT DOCUMENTS 5,541,707 * 7/1996 Sasagaki et al. ...................... 396/287
5,708,882 * 1/1998 Yokonuma et al. .................. 396/302
5,710,954 * 1/1998 Inoue ..................................... 396/374
5,867,741 * 2/1999 Muruyama et al. .................. 396/374

* cited by examiner

Primary Examiner—Alan A. Mathews
(74) Attorney, Agent, or Firm—Frishauf, Holtz, Goodman, Langer & Chick, P.C.

(57) ABSTRACT

This invention provides a photographing and electronic photographing camera capable of attaining energy saving without deteriorating the operability for the user. In the camera of this invention, an object image is converted into an electrical signal by an image pickup element, an image signal is formed based on the converted electrical signal by an image processing circuit and an image is displayed on a monitor. The monitor image is automatically turned OFF by specification from a control circuit. Further, the image signal is stored into an image storage circuit in the image processing circuit and the mode of the camera is set by an operation switch group. The monitor is turned ON again and the newest image stored in the image storage circuit in the image processing circuit is displayed on the monitor if the operation switch group is operated while the monitor image is kept in the OFF state by the control circuit.

14 Claims, 4 Drawing Sheets

CAMERA FOR ELECTRONIC PHOTOGRAPHING AND PHOTOGRAPHING USING FILMS

BACKGROUND OF THE INVENTION

This invention relates to a camera for electronic photographing and photographing using films having functions of a photographing device for exposing an object image on a film and an electronic photographing device having an electronic image pickup element for converting the object image into an electrical signal.

Recently, a photographing camera having a function of confirming the object image photographed at the time of photographing is developed. For example, in Jpn. Pat. Appln. KOKAI Publication No. 1-114169, a single-lens reflex camera which additionally has a confirming function by transmitting a picture signal corresponding to an optical image obtained by changing the direction of light flux of the object and focusing the object image by use of a mirror interlocked with the shutter is disclosed.

Further, various types of digital cameras having monitor functions for confirming an object image photographed at the time of photographing are developed. In a monitor mounted on this type of digital camera, if a monitored image is turned OFF after a preset period of time has elapsed, an image which was displayed on the monitor immediately before turn-OFF of the monitored image is displayed again by turning ON the power switch.

The monitor used for confirmation at the time of photographing requires a large current. Therefore, it is preferable to turn OFF the monitor in the normal state and display the image only at the time of confirmation of the image from the viewpoint of energy saving.

However, in Jpn. Pat. Appln. KOKAI Publication No. 1-114169, it is disclosed that the image is confirmed by use of the monitor, but turn-OFF of the monitor is not described.

Further, in the above digital camera, the image is displayed again by turning ON the power switch again after the monitor is turned OFF after a preset period of time has elapsed. However, if re-display of the monitored image can be controlled only by turning ON the power switch again, it is not convenient for the user and the camera has a problem in its operability.

BRIEF SUMMARY OF THE INVENTION

Accordingly, an object of this invention is to provide a camera for electronic photographing and photographing using films capable of attaining energy saving of the camera without deteriorating the operability for the user.

A first object of this invention can be attained by a camera comprising a photographing device for exposing an object image on a film; an electronic photographing device having an electronic photographing element for converting the object image into an electrical signal; a storage circuit for storing an image signal output from the electronic photographing device; a monitor for displaying an electronic image based on the image signal; a control circuit for automatically turning OFF the monitor; a power supply switch of the camera; and an operating member of the camera; wherein the monitor is turned ON again and the newest image stored in the storage circuit is displayed on the monitor by operating the operating member while the monitor is set in the turn-OFF state.

A second object of this invention can be attained by a camera comprising a photographing device for exposing an object image on a film; an electronic photographing device having an electronic photographing element for converting the object image into an electrical signal; a storage circuit for storing an image signal output from the electronic photographing device; a monitor for displaying an electronic image based on the image signal; a control circuit for automatically turning OFF the monitor; and an operating member for setting the mode of the camera; wherein the monitor is turned ON again and the newest image stored in the storage circuit is displayed on the monitor by operating the operating member while the monitor is set in the turn-OFF state.

A third object of this invention can be attained by a camera comprising a photographing device for exposing an object image on a film; an electronic photographing device having an electronic photographing element for converting the object image into an electrical signal; a storage circuit for storing an image signal output from the electronic photographing device; a monitor for displaying an electronic image based on the image signal; a control circuit for automatically turning OFF the monitor; and an operating member for starting the photographing operation of the electronic photographing device; wherein the monitor is turned ON again and the newest image stored in the storage circuit is displayed on the monitor by operating the operating member while the monitor is set in the turn-OFF state.

A fourth object of this invention can be attained by a camera comprising a photographing device for exposing an object image on a film; an electronic photographing device for photographing an image substantially equivalent to an image exposed on the film in synchronism with the operation of the photographing device; a storage circuit for storing image data photographed by the electronic photographing device; a monitor for displaying an image photographed by the electronic photographing device; a control circuit for automatically turning OFF the monitor; and an operating member for starting the photographing operation of the electronic photographing device or setting the mode of the camera; wherein the monitor is turned ON again and the newest image stored in the storage circuit is displayed on the monitor by operating the operating member while the monitor is set in the turn-OFF state.

A fifth object of this invention can be attained by a camera comprising a photographing device for exposing an object image on a film; an electronic photographing device for photographing an image substantially equivalent to an image exposed on the film in synchronism with the operation of the photographing device; a storage circuit for storing image data photographed by the electronic photographing device; a monitor for displaying an image photographed by the electronic photographing device; a control circuit for automatically turning OFF the monitor; and an operating member for detecting the open/closed state of a lid of the camera; wherein the monitor is turned ON again and the newest image stored in the storage circuit is displayed on the monitor by operating the operating member while the monitor is set in the turn-OFF state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described an embodiment of this invention with reference to the accompanying drawings.

Figure 1:
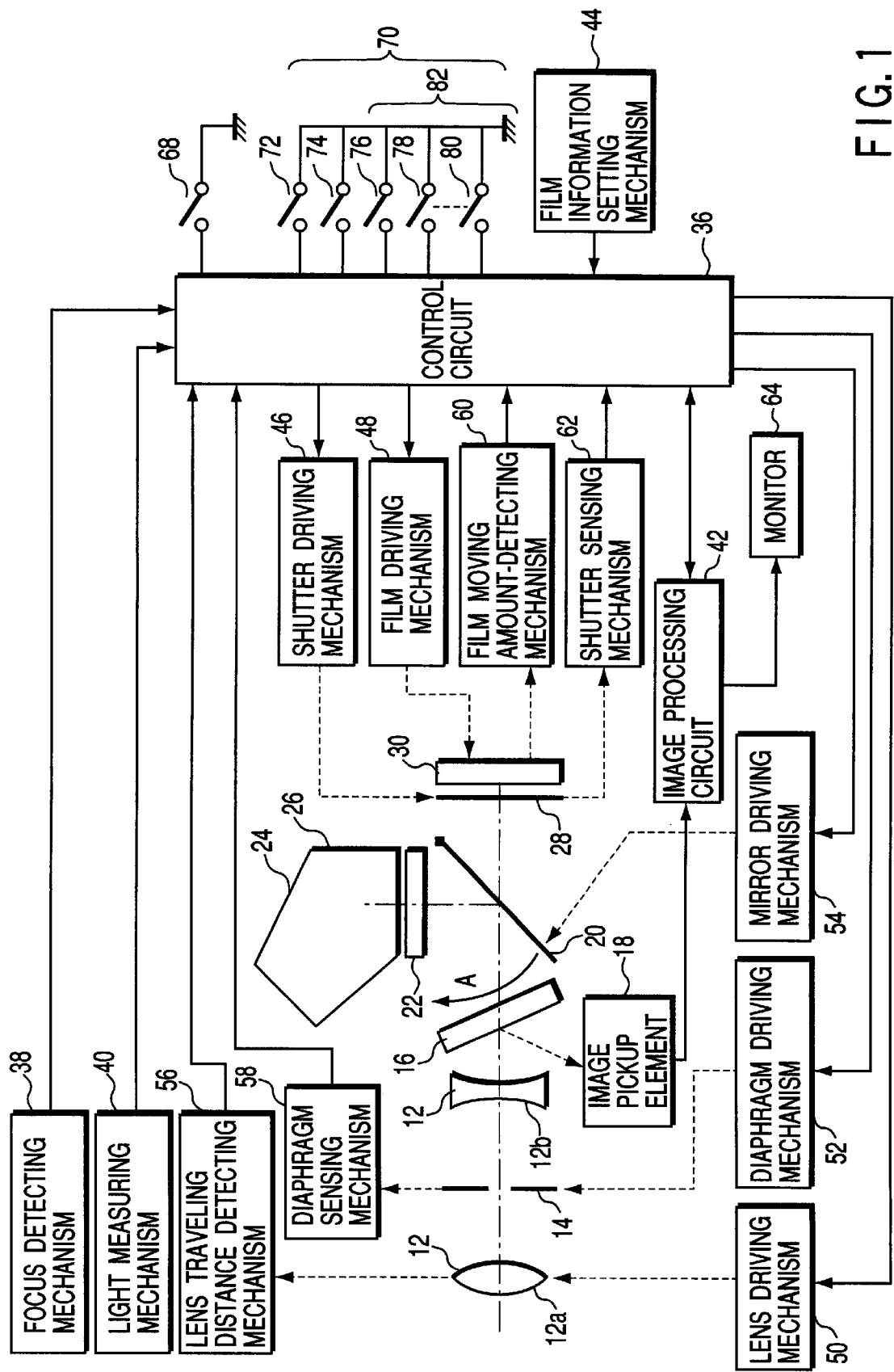
FIG. 1 is a function block diagram of a single-lens reflex camera according to one embodiment of this invention.

FIG. 1 is a function block diagram of a single-lens reflex camera according to one embodiment of this invention.

In FIG. 1, light from an object is guided to a half mirror 16 via a photographing lens 12 constructed by a plurality of optical systems 12a, 12b and a diaphragm member 14. The half mirror 16 separates part of the photographing light flux and approx. 50% of the light flux of the object is reflected in a direction towards the lower left portion in FIG. 1. The reflected light flux of the object is made incident on an image pickup element (electronic image pickup element) 18 constructed by a CCD or the like. The image pickup element 18 is used to convert the object image on the focusing plane into analog image data.

A main mirror 20 which is rotatable in a direction indicated by an arrow A is disposed behind the half mirror 16. Light flux reflected by the main mirror 20 is guided to a focusing screen 22 disposed in the upper portion in FIG. 1. The object image focused on the focusing screen 22 is guided to a finder eyepiece portion 26 via a penta prism 24, thereby making it possible to optically observe the object image.

When the main mirror 20 is moved back in the direction indicated by the arrow A, that is, in the upward direction, the light flux passing through the half mirror 16 is guided to a film 30 via a shutter 28 contained in the film photographing device and is focused thereon.

A control circuit 36 controls the operation sequence of the camera and additionally has a function as turn-OFF means. The control circuit 36 is connected to a focus detecting mechanism 38 for detecting an out-of-focus amount of the object, a light measuring mechanism 40 for detecting the luminance level of the object, an image processing circuit 42 for processing an electronic image which is substantially equivalent to the optical image recorded on the film 30 and a film information setting mechanism 44 for setting the ISO sensitivity and the maximum number of frames of the film 30.

Further, the control circuit 36 is connected to various driving mechanisms (shutter driving mechanism 46, film driving mechanism 48, lens driving mechanism 50, diaphragm driving mechanism 52, mirror driving mechanism 54) operated according to control signals output from the output ports of the control circuit 36, various detecting mechanisms (lens traveling distance detecting mechanism 56, diaphragm sensing mechanism 58, film moving amount-detecting mechanism 60, shutter sensing mechanism 62) for inputting status signals to the input ports of the control circuit 36, a power switch 68 and an operation switch group 70 acting as an operating member.

The image processing circuit 42 converts the analog image data from the image pickup element 18 into a digital form (performs the A/D conversion) to form digital image data in response to a control signal from the control circuit 36 and displays the digital image data on a monitor 64 used as monitor means.

The diaphragm member 14 is driven by the diaphragm driving mechanism 52. While the diaphragm member 14 is being driven by the diaphragm driving mechanism 52, the diaphragm state is sensed by the diaphragm sensing mechanism 58 and the control circuit 36 controls the diaphragm driving operation in response to a signal from the diaphragm sensing mechanism 58. The diaphragm sensing mechanism 58 detects the movement of a member in the diaphragm driving mechanism 52 which is connected to the diaphragm member 14 by use of a non-contact type sensor constructed by a photo-interrupter, photo-reflector, hole element or the like.

The focus adjusting optical system 12a of the photographing lens 12 is driven by the lens driving mechanism 50 and the traveling distance thereof is detected by the lens traveling distance detecting mechanism 56. The control circuit 36 controls the movement of the focus adjusting optical system 12a in response to a signal from the lens traveling distance detecting mechanism 56. The lens traveling distance detecting mechanism 56 detects the rotation amount of a comb-shaped rotating member provided in part of the transmission system of the lens driving mechanism 50 by use of a photo-interrupter.

The charging and opening/closing operations of the shutter 18 are effected by the shutter driving mechanism 46. The charging and opening/closing states of the shutter 18 are detected by the shutter sensing mechanism 62. The control circuit 36 controls the charging and opening/closing states of the shutter in response to a signal from the shutter sensing mechanism 62. Like the diaphragm sensing mechanism 58, the shutter sensing mechanism 62 is constructed by a non-contact type sensor.

The film 30 is taken up and rewound by the film driving mechanism 48. The moving amount of the film 30 is detected by the film moving amount-detecting mechanism 60. The control circuit controls the movement of the film 30 in response to a signal from the film moving amount-detecting mechanism 60. The film moving amount-detecting mechanism 60 detects perforations (not shown) formed in the film 30 by use of a photo-interrupter, photo-reflector or the like.

The main mirror 20 selectively guides the light flux from the object to the finder eyepiece portion 26 and silver halide film 30 and is moved back upwardly (in the direction indicated by the arrow A in FIG. 1) prior to the exposing operation. The move-back operation is effected according to a control signal from the control circuit 36 by the mirror driving mechanism 54 having a motor.

The operation switch group 70 includes various switches related to the camera operations, for example, a first release switch 72, second release switch 74, rear lid switch 76, photographing mode switching switch 78, strobe mode switch 80 and the like.

Next, the construction and operation of the image processing circuit 42 are explained in detail.

Figure 2:
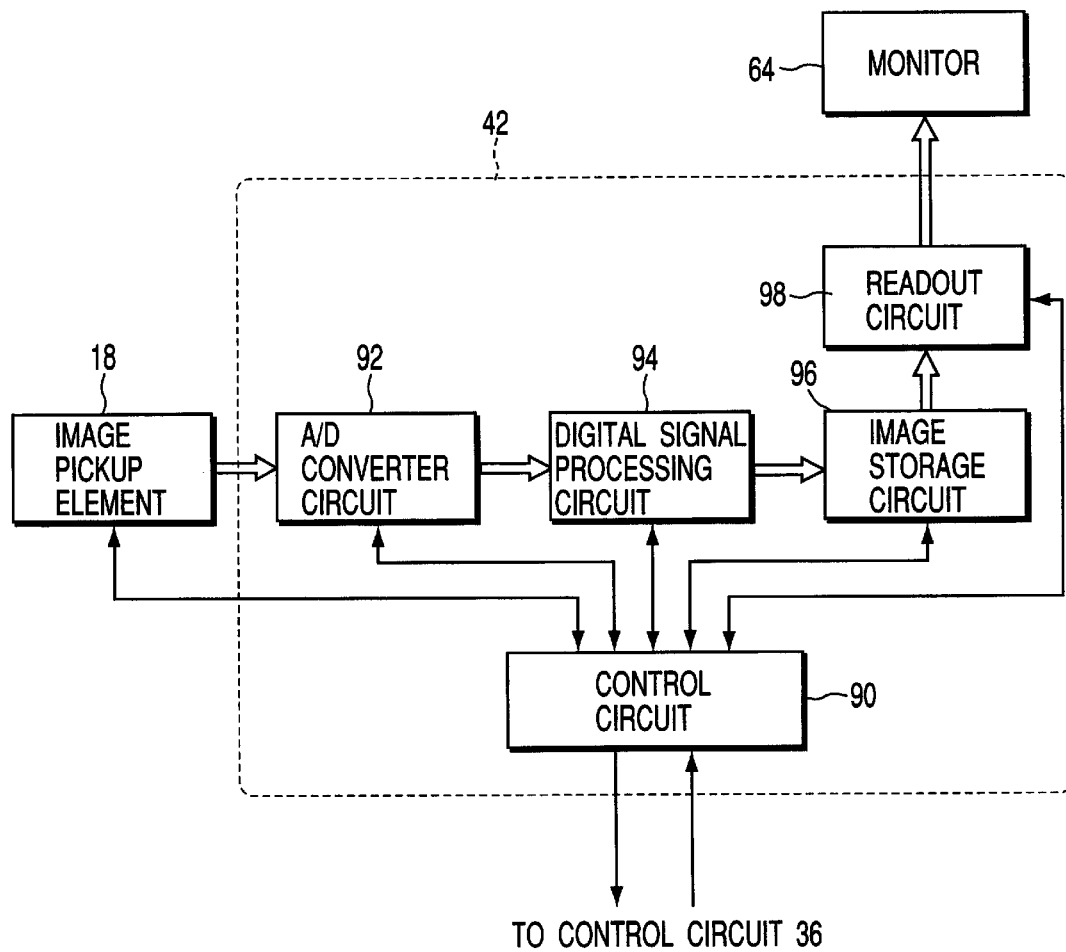
FIG. 2 is a block diagram showing the detail construction of an image processing circuit of FIG. 1.

FIG. 2 is a block diagram showing the detail construction of the image processing circuit 42.

In FIG. 2, the image processing circuit 42 includes a control circuit 90 for controlling the sequence of the image processing operations, an A/D converter circuit 92 for A/D converting an output of the image pickup element 18, a digital signal processing circuit 94 for processing an output of the A/D converter circuit 92 to form image data suitable for monitor display, an image storing circuit 96 used as storing means for temporarily storing an output of the digital signal processing circuit 94, and a readout circuit 98 for reading out image data temporarily stored in the image storing circuit 96 and displaying the same on the monitor 64.

The control circuit 90 controls two image processing operations, and one of the image processing operations is an analog image data fetching operation and the other is a digital image data display operation. The image data fetching operation is described as follows.

That is, the control circuit 90 causes the image pickup element 18 to start the integrating operation in response to an image fetching specifying signal from the control circuit 36 and specifies the A/D converter circuit 92 to A/D convert the output of the image pickup element 18 if an integration termination signal from the image pickup element 18 is received. Further, the control circuit 90 specifies the digital signal processing circuit 94 to process image data for monitor display if an A/D conversion completion signal is received from the A/D converter circuit 92. If a process completion signal is received from the digital signal processing circuit 94, the control circuit 90 causes the image storing circuit 96 to store an output of the digital signal processing circuit 94. Further, if a storage completion signal is received from the image storing circuit 96, the control circuit 90 transmits a fetching completion signal to the control circuit 36.

The image data display operation is an operation for specifying the readout circuit 98 to read out image data stored in the image storing circuit 96 and display the readout image data on the monitor 64 and transmitting a display completion signal to the control circuit 36 if a display completion signal is received from the readout circuit 98.

An electronic image pickup device is constructed by at least the image pickup element 18, control circuit 90, A/D converter circuit 92 and digital signal processing circuit 94.

Figure 3A:
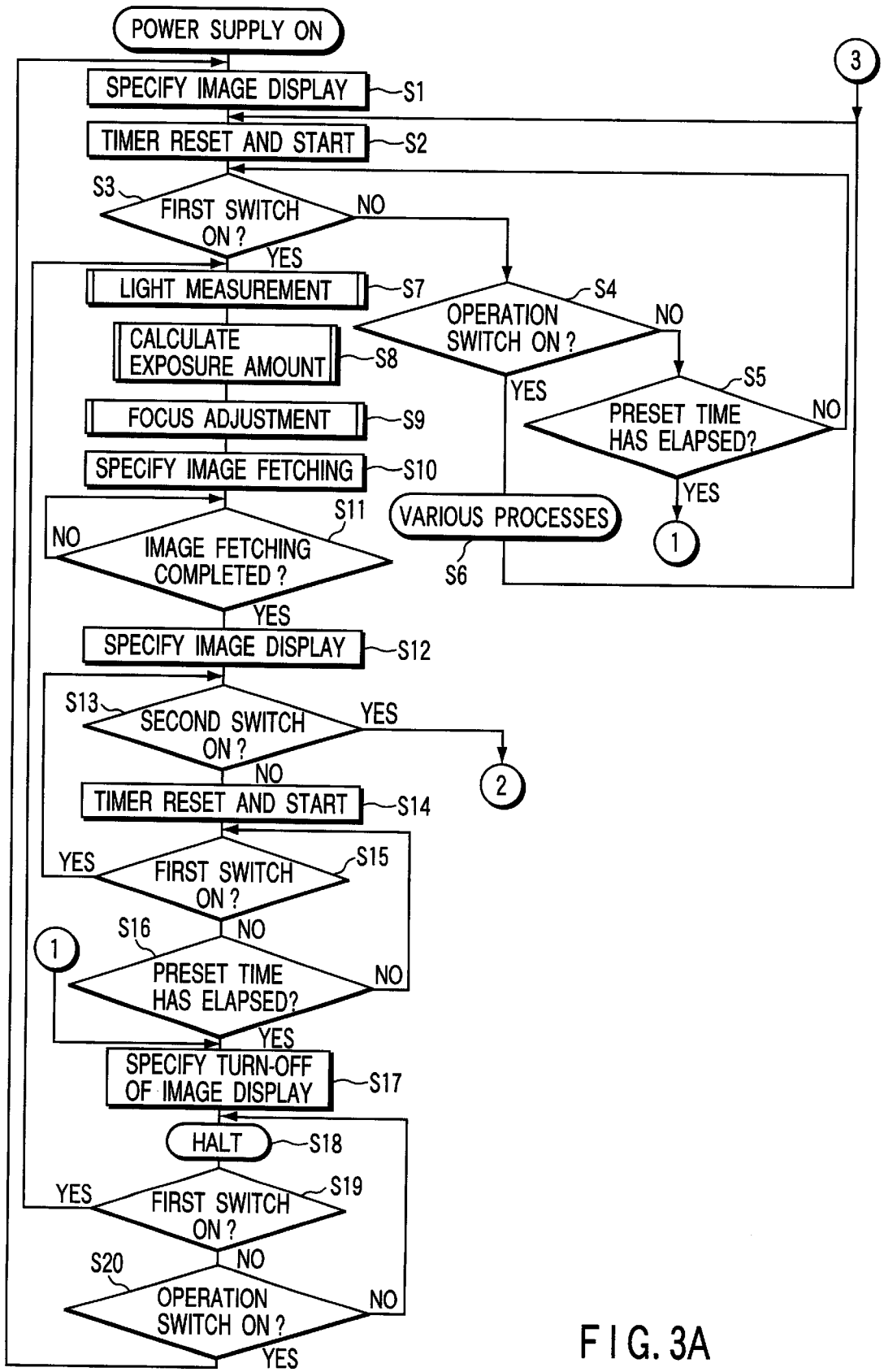
FIGS. 3A and 3B are flowcharts for illustrating the operation of a camera according to the embodiment of this invention.
Figure 3B:
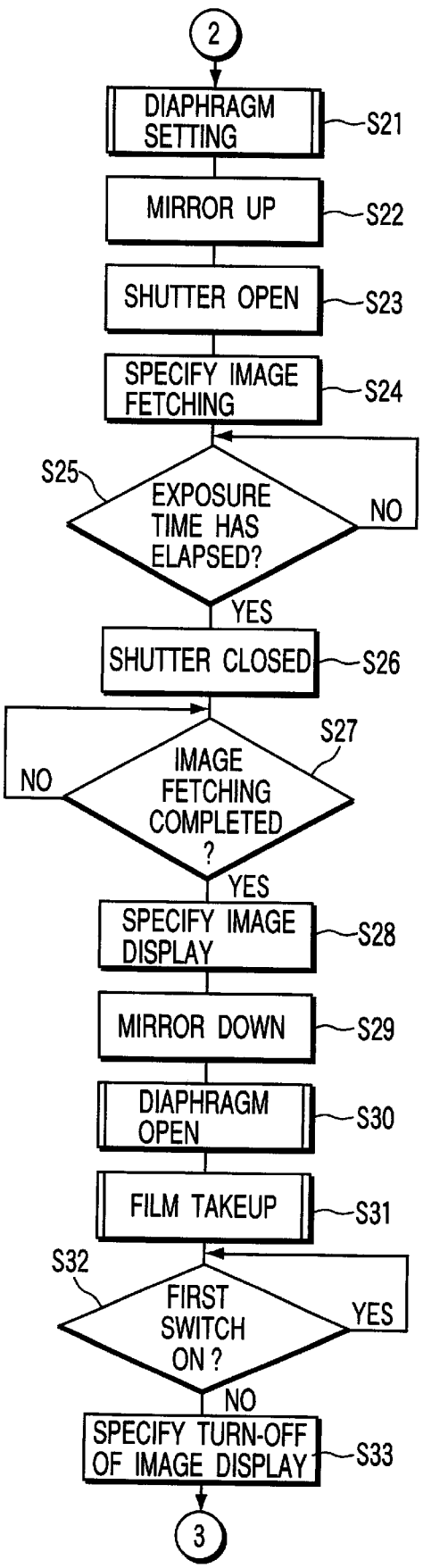

Next, the camera operation in this embodiment is explained with reference to the flowcharts shown in FIGS. 3A and 3B.

If the power switch 68 is turned ON, the newest image among the images photographed so far is displayed on the monitor 64 in the step S1. Then, if the timer is reset and started in the step S2, whether or not the first release switch (1st. SW) 72 is turned ON is determined in the step S3.

At this time, if the first release switch is not turned ON, the step S4 is effected and the state of the operation switch (SW) 82 is detected. Then, if the operation switch 82 is not turned ON, the step S5 is effected to determine whether a preset period of time has elapsed or not. In this case, if the preset period of time has not elapsed, the step S3 is effected again and if the preset period of time has elapsed, the step S17 is effected.

In the step S17, image display of the monitor 64 is turned OFF and the "HALT" state, that is, low power consumption state is set up in the next step S18. If the low power consumption state is set up, the camera operation is interrupted until at least one of the first release switch and other operation switches 82 is operated. Therefore, none of the first release switch and other switches 82 are turned ON in the steps S19 and S20, the process is returned to the step S18 and the "HALT" state is maintained.

If at least one of the first release switch and other switches 82 is operated in the steps S19 and S20, the "HALT" state is released and the process is returned to the step S7 or S1.

In the step S4, if the operation switch 82 is turned ON, the step S6 is effected. In this case, the operation such as the photographing mode switching operation, strobe mode switching operation or other operation assigned to the operation switch is effected. After the corresponding operation is effected, the step S2 is effected again.

If the first release switch 72 is turned ON in the step S3, the step S7 is effected to effect the light measuring process. Then, an exposure light amount is calculated based on the light measurement in the step S8 and the focus adjustment is made in the step S9.

After this, the image fetching specifying operation is effected in the step S10. As a result, an image is fetched by the image pickup element 18 and image processing circuit 42. Next, if the image fetching operation is completed in the step S11, the monitor 64 is specified to display the image in the step S12.

Next, in the step S13, whether the second release switch 74 is turned ON or not is determined. At this time, if the second release switch 74 is not turned ON, the step S14 is effected and the timer is reset again and the timer is started again.

Then, the state of the first release switch 72 is determined in the step S15. If the first release switch 72 is set in the ON state, the step S13 is effected again and if the first release switch is not set in the ON state, the step S16 is effected to determine whether the preset period of time has elapsed or not. In this case, if the preset period of time has not elapsed, the process is returned to the step S15, and if the preset period of time has elapsed, the step S17 is effected to specify turn-OFF of image display and the "HALT" state is set up in the step S18.

If it is detected in the step S13 that the second release switch 74 is turned ON, the diaphragm setting operation is effected in the step S21. Next, the main mirror 20 is moved back in the direction indicated by the arrow A in FIG. 1 in the step S22 and the shutter 28 is opened by the shutter driving mechanism 46 in the step S23. While the shutter 28 is kept open, an object image is exposed on the film 30.

Further, in the step S24, the same image fetching specifying operation as in the step S10 is effected. In this case, if a preset period of exposure time has elapsed in the step S25, the step S26 is effected to close the shutter 28 and completion of the image fetching operation is determined in the step S27.

If it is determined in the step S27 that the operation for image fetching on the film 10 is completed, image display on the monitor 64 is specified in the step S28. Then, the main mirror 20 which has been moved back is moved down and set into the optical path in the step S29. Next, the diaphragm member 14 is opened in the step S30 and the film 30 is taken up by the film driving mechanism 48 in the step S31.

After this, the state of the first release switch 72 is detected in the step S32. In this case, if no specification is made, the step S33 is effected to specify turn-OFF of image display on the monitor 64.

Thus, the normal photographing mode can be restored if the power switch 68 is operated again at the time of low power consumption mode of the camera or at least one of the first release switch 72 and operation switches 82 is operated and image display can be made on the monitor 64 immediately after photographing.

As described above, according to this invention, a silver halide photographing and electronic photographing camera for attaining the energy saving of the camera without deteriorating the operability for the user can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a photographing device for exposing an object image on a film;

an electronic photographing device having an electronic photographing element for converting the object image into an electrical signal;

a storage circuit for storing an image signal output from said electronic photographing device;

a monitor for displaying an electronic image based on the image signal;

a control circuit for automatically turning OFF said monitor;

a power supply switch of the camera; and an operating member of the camera;

wherein said monitor is turned ON again and the newest image stored in said storage circuit is displayed on said monitor by operating said operating member while said monitor is set in the turn-OFF state.

2. The camera according to claim 1, wherein said monitor is turned ON again and the newest image stored in said storage circuit is displayed on said monitor by operating said operating member while said power switch of the camera is set in the ON state and said monitor is set in the turn-OFF state.

3. A camera comprising:

a photographing device for exposing an object image on a film;

an electronic photographing device having an electronic photographing element for converting the object image into an electrical signal;

a storage circuit for storing an image signal output from said electronic photographing device;

a monitor for displaying an electronic image based on the image signal;

a control circuit for automatically turning OFF said monitor; and an operating member for setting the mode of the camera;

wherein said monitor is turned ON again and the newest image stored in said storage circuit is displayed on said monitor by operating said operating member while said monitor is set in the turn-OFF state.

4. The camera according to claim 3, wherein said control circuit turns OFF said monitor if said operating member is not operated for a preset period of time.

5. The camera according to claim 3, wherein said operating member is usable to change the mode of the camera when said monitor is turned again.

6. The camera according to claim 3, wherein said operating member includes at least one of a photographing mode switching switch and a strobe mode switch.

7. The camera according to claim 3, further comprising a finder eyepiece portion capable of optically observing the object image.

8. A camera comprising:

a photographing device for exposing an object image on a film;

an electronic photographing device having an electronic photographing element for converting the object image into an electrical signal;

a storage circuit for storing an image signal output from said electronic photographing device;

a monitor for displaying an electronic image based on the image signal;

a control circuit for automatically turning OFF said monitor; and an operating member for starting the photographing operation of said electronic photographing device;

wherein said monitor is turned ON again and the newest image stored in said storage circuit is displayed on said monitor by operating said operating member while said monitor is set in the turn-OFF state.

9. The camera according to claim 8, wherein said control circuit turns OFF said monitor if said operating member is not operated for a preset period of time.

10. The camera according to claim 8, wherein said electronic image pickup device starts the photographing operation, an image signal output from said electronic image pickup device is stored into said storage circuit and the newest image stored in said storage circuit is displayed on said monitor if said operating member is operated when said monitor is set in the turn-OFF state.

11. The camera according to claim 8, wherein said operating member is a release switch.

12. The camera according to claim 8, further comprising a finder eyepiece portion for making optical observing of the object image possible.

13. A camera comprising:

a photographing device for exposing an object image on a film;

an electronic photographing device for photographing an image substantially equivalent to an image exposed on the film in synchronism with the operation of said photographing device;

a storage circuit for storing image data photographed by said electronic photographing device;

a monitor for displaying an image photographed by said electronic photographing device;

a control circuit for automatically turning OFF said monitor; and an operating member for starting the photographing operation of said electronic photographing device or setting the mode of the camera;

wherein said monitor is turned ON again and the newest image stored in said storage circuit is displayed on said monitor by operating said operating member while said monitor is set in the turn-OFF state.

14. A camera comprising:

a photographing device for exposing an object image on a film;

an electronic photographing device for photographing an image substantially equivalent to an image exposed on the film in synchronism with the operation of said photographing device;

a storage circuit for storing image data photographed by said electronic photographing device;

a monitor for displaying an image photographed by said electronic photographing device;

a control circuit for automatically turning OFF said monitor; and an operating member for detecting the open/closed state of a lid of the camera;

wherein said monitor is turned ON again and the newest image stored in said storage circuit is displayed on said monitor by operating said operating member while said monitor is set in the turn-OFF state.

* * * * *

UNITED STATES PATENT AND TRADEMARK OFFICE
CERTIFICATE OF CORRECTION

PATENT NO. : 6,249,651 B1
DATED : June 19, 2001
INVENTOR(S) : Atsushi Murayama

It is certified that error appears in the above-identified patent and that said Letters Patent is hereby corrected as shown below:

<u>Title page,</u>
Item [56], References Cited, insert
-- OTHER PUBLICATIONS
   Patent Abstracts of Japan, Publication No.
   01114169 A, Published: May 2, 1989, Masafumi,
et al. --.

Signed and Sealed this

Nineteenth Day of March, 2002

Attest:

JAMES E. ROGAN
Director of the United States Patent and Trademark Office

Attesting Officer